United States Patent [19]

Schechter

[11] Patent Number: 5,165,368
[45] Date of Patent: Nov. 24, 1992

[54] INTERNAL COMBUSTION ENGINE WITH VARIABLE COMPRESSION RATIO

[75] Inventor: Michael M. Schechter, Farmington Hills, Mich.

[73] Assignee: Ford Motor Company, Dearborn, Mich.

[21] Appl. No.: 856,268

[22] Filed: Mar. 23, 1992

[51] Int. Cl.⁵ ............................................. F02B 75/02
[52] U.S. Cl. .................................. 123/48 B; 123/78 F
[58] Field of Search ................. 123/48 R, 48 B, 78 E, 123/78 F, 197.4, 197.3

[56] References Cited

U.S. PATENT DOCUMENTS

| | | | |
|---|---|---|---|
| 1,476,309 | 12/1923 | Toth | 123/78 F |
| 1,987,661 | 1/1935 | Blauvelt et al. | 123/78 F |
| 2,060,221 | 11/1936 | King . | |
| 3,180,178 | 4/1965 | Brown et al. . | |
| 4,301,695 | 11/1981 | Reiher | 123/78 F |
| 4,406,257 | 9/1983 | Akkerman | 123/78 E |
| 5,002,023 | 3/1991 | Butterfield et al. | 123/90.15 |

FOREIGN PATENT DOCUMENTS

| | | | |
|---|---|---|---|
| 0064131 | 5/1980 | Japan . | |
| 58-38343 | 3/1983 | Japan | 123/78 E |
| 58-93935 | 6/1983 | Japan | 123/48 B |

Primary Examiner—David A. Okonsky
Attorney, Agent, or Firm—Jerome R. Drouillard; Roger L. May

[57] ABSTRACT

A combination hydraulic and mechanical mechanism for varying the stoke/clearance volume of an engine in response to the alternating torsional impulses of the engine that are applied through the piston and connecting rod mechanism. An eccentric on which the connecting rod is journaled is rotated relative to the crankshaft to vary the crank radius, which will vary the compression ratio and make other changes in the thermodynamic cycle. A fluid pressure control system includes a pressure movable shaft controlling the flow of fluid past one-way check valves to oil filled hydraulic cylinders that contain pistons/plungers operably connected to the eccentric and crankshaft, to control the movement of the eccentric in response to the torsional impulses.

17 Claims, 4 Drawing Sheets

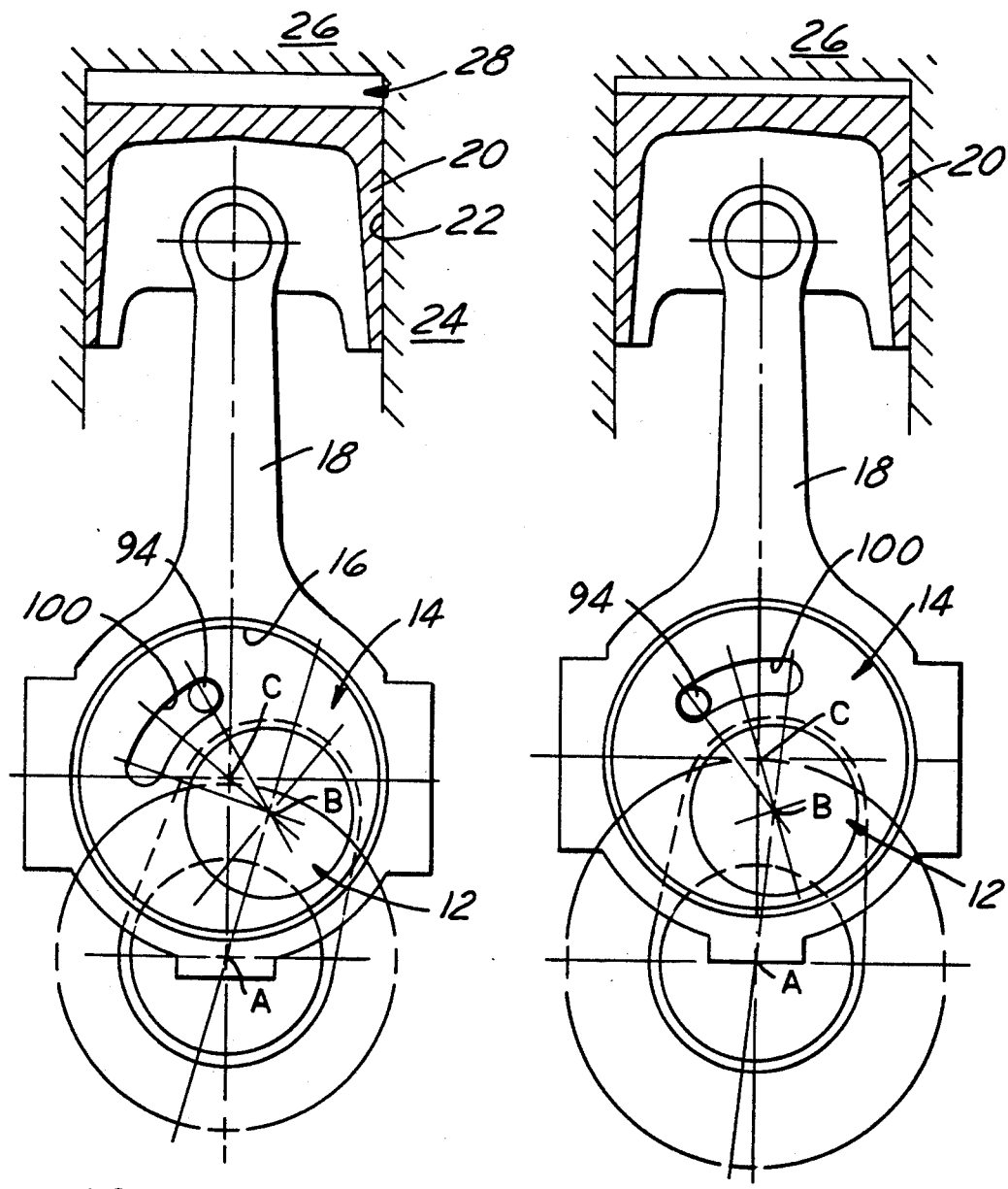
FIG.7A — LOW COMPRESSION RATIO
FIG.7B — HIGH COMPRESSION RATIO

5,165,368

INTERNAL COMBUSTION ENGINE WITH VARIABLE COMPRESSION RATIO

FIELD OF THE INVENTION

This invention relates in general to an automotive type internal combustion engine. More particularly, it relates to one in which the compression ratio and the clearance volume can be varied to provide better engine operating efficiency.

BACKGROUND OF THE INVENTION

Variable compression ratio in an internal combustion engine is a useful feature which can contribute to better fuel economy. This can be accomplished by varying the compression ratio as a function of engine speed and load so as to maximize the efficiency of the thermodynamic cycle without inducing engine knock. A straightforward way to vary the compression ratio is by varying the TDC (top dead center) clearance volume. This invention is directed to a mechanism for varying the clearance volume by varying the crank radius by use of an eccentric moved in response to variable control fluid pressure and utilizing the engine torsional forces transmitted from the piston to the crankshaft.

DESCRIPTION OF THE PRIOR ART

U.S. Pat. No. 2,060,221 to King shows an eccentric sleeve 63 on the crank pin that is manually adjusted by a lever/crank 103 to adjust the compression ratio/clearance volume.

JAPAN 0064131 to Tominaga also shows the use of an eccentric 13 for adjusting the compression ratio/clearance volume.

U.S. Pat. No. 3,180,178 to Brown et al. uses an eccentric 20 mounted on the crank pin 5 for varying the stroke of the piston. The engine lubricating system is used to hydraulically rotate the eccentric by means of a cage 33 defining a chamber containing vane type piston elements 37 fixed to the eccentric for arcuate movement relative to vanes 36 fixed to the crankshaft web 18. Opposite sides of the chamber are interconnected by fluid passages containing one-way check valves controlling the flow out of one chamber and into the other, and vice-versa, to control the rotation of the eccentric. In FIG. 8, counterweights 48 fixed to the crankshaft webs 18 operate a spring closed spool valve 50 to control the direction of fluid supply and vent to the various compartments of the chamber. Control of the valve is made by changing the lubricating supply pressure in line 51 to move spool valve 50. Fluid in the chambers is pressurized in response to the torque loads on the crankshaft exerted by the piston. However, engine torque pulses are used only incidentally to aid in moving the rotor, and only at certain angles of the crankshaft. The primary force for moving the valve is the fluid pressure supply in line 51.

U.S. Pat. No. 4,406,256 to Akkerman shows the use of an eccentric sleeve E for controlling the compression ratio/clearance volume. A latching pawl F can lock the eccentric to the connecting rod in various positions corresponding to different lengths; a hydraulically controlled valve J is responsive to manifold vacuum to move the pawl/latch outwards to vary the rod length.

U.S. Pat. No. 5,002,023 to Butterfield et al. shows a mechanism for adjusting a camshaft relative to the crankshaft to change the engine timing. It includes a pair of cylinders having a pair of plungers that move in opposite directions; i.e., the opposite ends of the pair of cylinders are interconnected whereby movement of one plunger in one direction effects a movement of the other in the opposite direction, and vice-versa, and the cylinders are connected to the camshaft and thereby pressurized in response to the oscillating torque impulses on the camshaft to rotate the camshaft relative to the crankshaft, when permitted by a selectively controlled fluid pressure control valve.

SUMMARY OF THE INVENTION

This invention is directed to a simple and easily constructed combination hydraulic and mechanical mechanism for varying the stroke/clearance volume of an engine in response to the alternating torsional forces of the engine that are applied through the piston and connecting rod mechanism. The piston clearance volume is varied at TDC by rotating an eccentric relative to the crankshaft to vary the crank radius, which varies the compression ratio and makes other changes in the thermodynamic cycle. A fluid pressure control system includes a pressure movable shaft that controls rotation of a cam lobe to control the flow of fluid past one-way check valves to hydraulic cylinders containing pistons/plungers operably connected to the eccentric and crankshaft to control the movement of the eccentric in response to the torsional impulses.

It is, therefore, a primary object of the invention to provide a simple, easily constructed mechanism for varying the engine stroke/clearance volume by utilizing a combined hydraulic/mechanical assembly in which an eccentric mounted on the crankshaft is rotated relative to it, when selectively scheduled, by the torsional forces alternately applied to it by the reciprocating motion of the piston, the schedule being determined by a selectively controlled fluid pressure control system.

Other objects, features and advantages of the invention will become more apparent upon reference to the succeeding, detailed description thereof, and to the drawings illustrating the Preferred embodiments thereof; wherein:

BRIEF DESCRIPTION OF THE DRAWINGS

FIGS. 7(a) and 7(b) are partial cross-sectional views of the engine embodying the invention illustrating different adjustable positions of the engine connecting rod and piston.

DESCRIPTION OF THE PREFERRED EMBODIMENT

Figure 1:
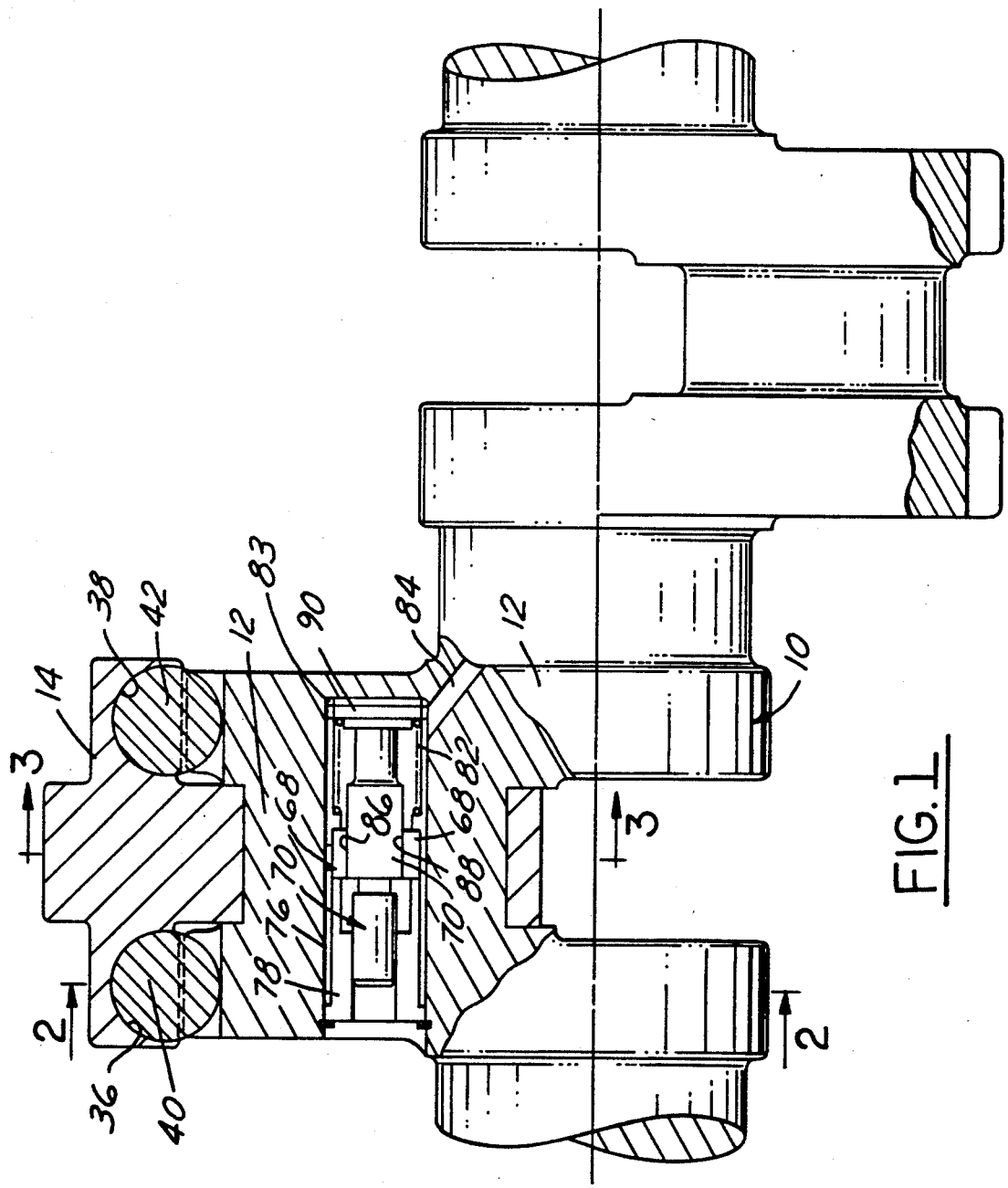
FIG. 1 is a partial cross-sectional view of an engine crankshaft embodying the invention.

FIG. 1 shows an engine crankshaft 10, with a basic or main crank journal 12 projecting therefrom. As best seen in FIGS. 1, 2, 3, 7a and 7b, mounted on the crank journal is an eccentric 14 having an outer cylindrical surface 16 that forms a new crank journal on which a connecting rod 18 is rotatably mounted. The connecting rod is pivotally attached in the usual manner to a piston 20 reciprocatingly movable in the bore 22 of an engine cylinder block 24. A cylinder head 26 closes the bore and defines a clearance volume 28 between it and the piston in the top dead center (TDC) position of the piston. It is this clearance volume that is varied by the mechanism of the invention to change the compression ratio.

Returning to FIGS. 1, 2 and 3, the eccentric 14 consists of two semi-cylindrical parts, an upper part 30 and a lower part 32, held together by pilot bolts 34. The crank radius is the distance from the center A of the main bearing to the center C of the eccentric. This distance can be varied by turning the eccentric clockwise or counter-clockwise relative to the basic crank journal 12, which will vary the clearance volume at TDC, as described previously in connection with FIG. 5.

Figure 2:
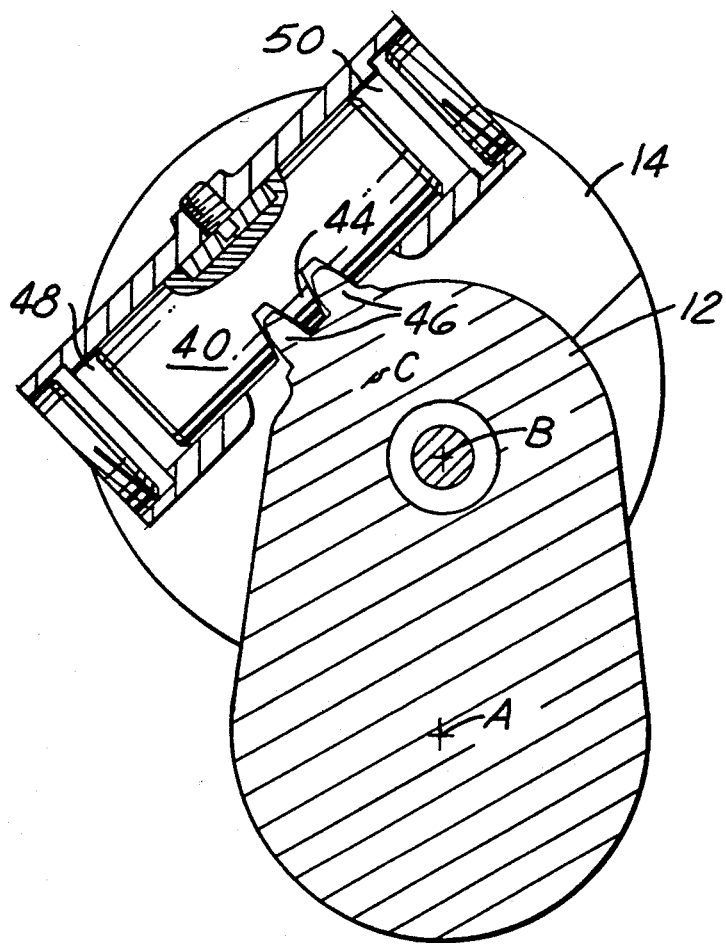
FIGS. 2 and 3 are cross-sectional views taken on planes indicated by and viewed in the direction of the arrows II—II and III—III of FIGS. 1.

The eccentric is provided with two cylindrical recesses or cylinders 36, 38 that are symmetrically located on opposite sides of the eccentric. The cylinders are filled with fluid and each contain a single plunger/piston 40, 42. As seen in FIG. 2, the plunger is provided with gear teeth 44 protruding from its central portion for engagement with corresponding teeth 46 formed on the crankshaft on both sides of the basic journal 12 (FIG. 1).

The spaces 48, 50 between the ends of the cylinders and the plungers define fluid chambers controlling the motion of the cylinder relative to the plunger. As long as the oil remains trapped in both ends of the chambers, the plunger does not move relative to the cylinder, the eccentric remains rigidly attached to the basic crank journal 12, and the crank radius is constant.

Figure 4A:
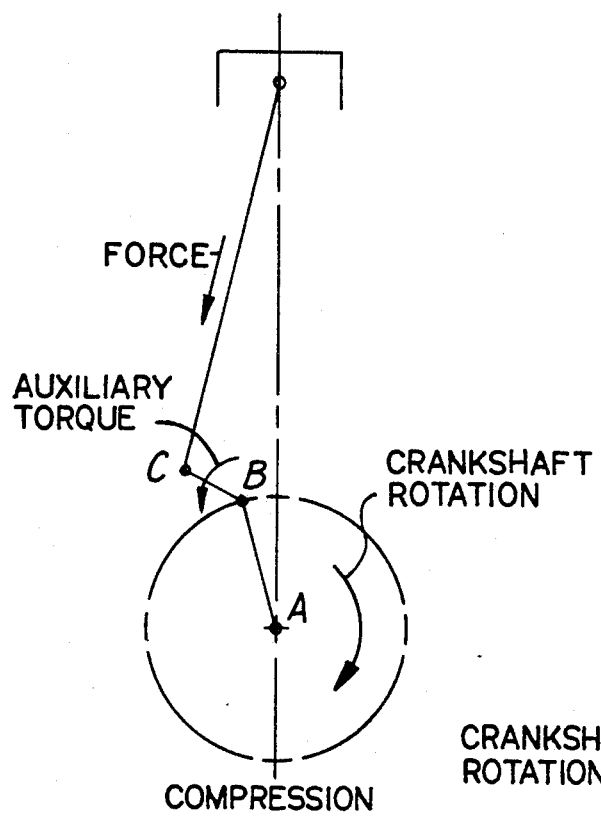
FIGS. 4(a) and 4(b) are diagrammatic illustrations of different operating positions of the engine of FIG. 1 embodying the invention.
Figure 4B:
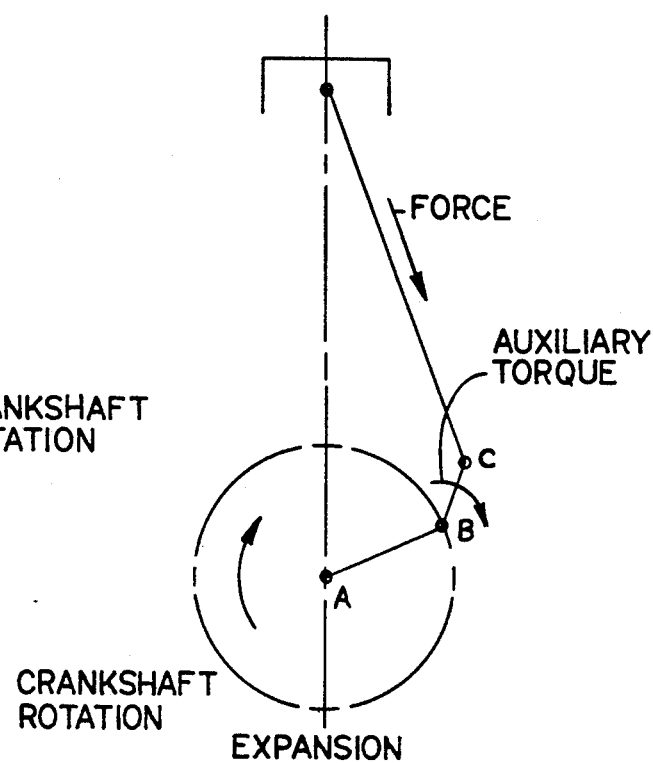

As best seen in FIGS. 4(a) and 4(b), the location of the eccentric 14 on the basic crank journal 12 is such that the line BC connecting the center of the basic crank journal with the center of the eccentric forms an acute angle with the upward extension of the line AB connecting the center of the main bearing journal with the center of the basic crank journal. This angle is to the left of the line AB for clockwise crankshaft rotation, as shown in FIG. 4(a), or to the right of the line AB if the rotation of the crankshaft is counter-clockwise (not shown). As a result, the downwardly indicated force that is transmitted from the piston through the connecting rod to the crankshaft generates an auxiliary torque which acts on the eccentric 14 through point C to point B in the direction opposite to the crankshaft rotation during the compression and early stage of expansion until an overcenter position of point C is reached, and in the direction coinciding with crankshaft rotation during the latter part of the expansion stroke, as shown in FIGS. 4(a) and 4(b).

It will be clear that the downward force indicated in FIG. 4A during the compression stroke, as the piston approaches TDC, will be much smaller than the downward force indicated in FIG. 4B subsequent to engine ignition. This large unbalance of downward forces, if left uncorrected, would provide an unsatisfactory operation.

The acute angle that the line AB provides with the line BC, however, compensates for this large difference by effectively equalizing the counterclockwise and clockwise auxiliary torsional forces. That is, it will be seen in FIG. 4A that the acute angle establishes a much more pronounced horizontal counterclockwise torsional component of the downward force than the clockwise force in FIG. 4B. In FIG. 4B, the horizontal clockwise torsional component does not become meaningful until the crank AB is significantly past the TDC position, and the gas force in the engine cylinder is significantly reduced.

Figure 3:
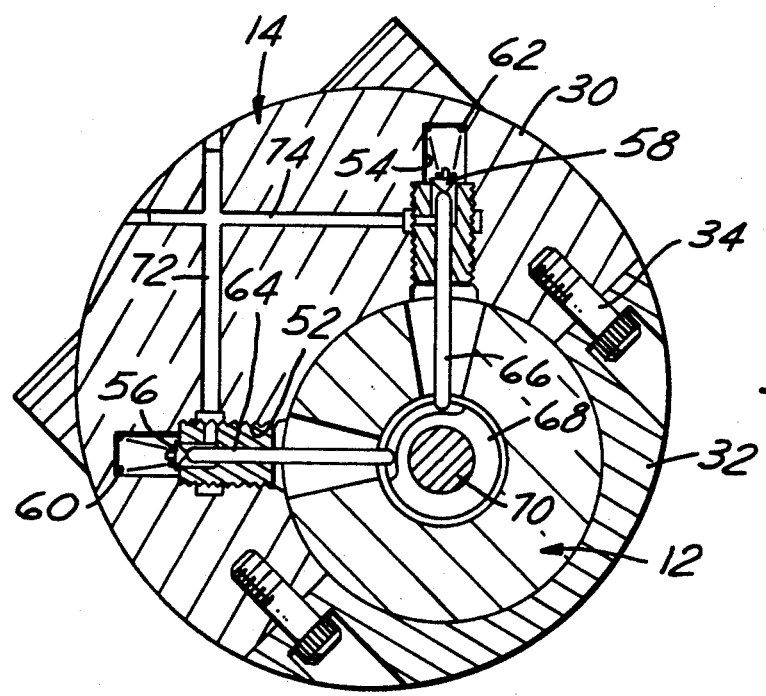

FIGS. 1 and 3 show a fluid pressure control system for selectively permitting one-way flow of oil from the one end chamber 48 of the cylinder to the other end 50 to control the movement of the plunger and eccentric. Within the eccentric 14 are a pair of stepped diameter recesses 52, 54, each of which contains a spring closed check valve 56, 58. The smaller diameter chambers 60, 62 formed behind the check valves 56, 58, respectively, are adapted to be connected directly to the respective opposite end chambers 48 and 50 of each cylinder 36, 38, by passage means not shown. As will be seen later, the check valves face one another in fluid flow relationship.

The check valves in this case are adapted to be opened by a pair of push rods 64, 66 seated at their opposite ends against a cam lobe 68 fixed on a shaft 70 (to be described) located inside the basic crank journal 12. The lobe has low and high profiles, and is shown in the neutral position in which the push rods are lowered to permit seating of the check valves. Turning the control cam lobe 68 clockwise relative to the eccentric 14 lifts the push rod 64 and opens the check valve 56. Turning the cam lobe counter-clockwise lifts the push rod 66 and opens the check valve 58.

As long as the control cam 68 remains in neutral position relative to the eccentric 14, both check valves remain closed, and the oil in the chambers 48 and 50 remain trapped therein. When the cam lobe 68 is turned counterclockwise from its neutral position and the check valve 58 is positively open, a one-way hydraulic connection between the two chambers 48 and 50 is formed. When the auxiliary torque generated by the reciprocating piston is in a counter-clockwise direction during the compression and early expansion strokes, FIGS. 4(a) and 4(b), this force acting through the eccentric against the cylinder generates a hydraulic pressure in chamber 50, which causes the oil to flow from chamber 50 out past the open check valve 58 through a pair of connecting passages 72, 74 to open check valve 56 and enter chamber 48.

The plungers are now free to move relative to the cylinders in response to the torsional force acting on the eccentric. The auxiliary torque now turns the eccentric 14 counter-clockwise while the teeth of the plungers 40, 42 perform a rocking motion about the center of the basic crank journal 12. When the auxiliary torque changes its direction to clockwise during the latter part of the expansion stroke, the hydraulic pressure in the chamber 48 becomes high, which closes the check valve 56, and the reverse flow of oil from chamber 48 to 50 is prevented.

Accordingly, the eccentric turns only counter-clockwise, reducing the crank radius and increasing the clearance volume, as shown in FIG. 7(a). Since the eccentric turns in the same direction as the control cam lobe 68 was turned, the neutral relative position of the cam lobe and the eccentric is eventually restored, the check valve 58 closed, and the relative rotation of the eccentric stops.

A similar process takes place when the cam lobe 68 is turned clockwise. In this case, the check valve 56 is forced open, oil flows from the chamber 48 to the chamber 50, and the eccentric is turned clockwise increasing the crank radius until the neutral relative position of the eccentric and the basic crank journal is restored. In essence, rotation of the control cam lobe 68 controls the motion of the eccentric, which follows the motion of the cam lobe, but the energy to perform the change in engine geometry is supplied by the piston.

The mechanism for varying the angular position of the cam lobe 68 is shown in FIG. 1. The control cam lobe is a part of a control cartridge located inside the basic crank journal. The cartridge includes an outer sleeve 76, a cylindrical shaft bore or barrel 78, a fluid movable shaft 70, the cam lobe 68, and a spring 82 biasing the shaft to the right. A spacer 83 holds the shaft away from the end of the cylinder to allow fluid or oil under pressure from a line 84 to enter back of the shaft.

The outer sleeve 76 is fixed inside the journal 12 both in axial and rotational directions. The central part of the shaft 70 has helical splines 86 that are engaged with corresponding helical splines 88 formed on the inside of the control cam lobe 68. As a result, the shaft 70 can move in axial directions, but is prevented from rotation because of an integral flange 90 formed at its end engaged with slots made in the sleeve 76.

The control cam lobe 68 is restricted in axial direction by the barrel 78 and a shoulder on the inside of the sleeve 76, but it can rotate. Therefore, axial motion of the shaft 70 with helical splines causes a rotation of the cam lobe that is proportional to the axial displacement of the shaft. Oil under controllable pressure supplied through the channel or passage 84 to the backside of the control cartridge at flange 90 increases the oil pressure to overcome the resistance of the spring 82 to move the shaft 70 to the left. If the oil pressure is reduced, the spring will move the shaft back to the right until a new balance is achieved between the oil pressure and the spring force. Therefore, controlling the oil pressure controls the angular position of the control cam lobe 68.

The oil pressure can be controlled by a pressure regulator which, in turn, could be controlled by the overall engine control system. The oil could be supplied by the engine lubrication system, or it could be a part of a separate hydraulic control system.

Figure 5:
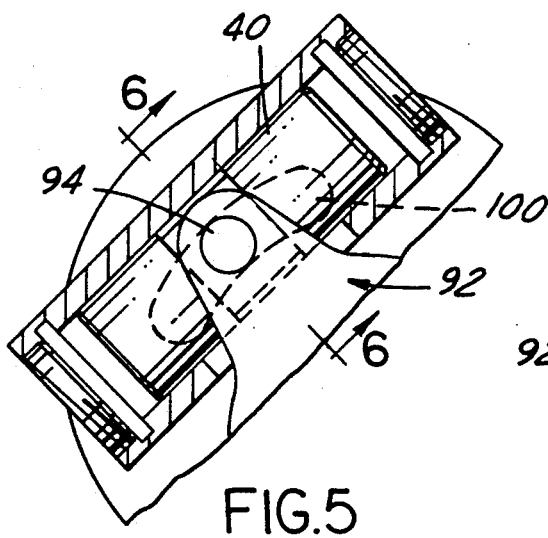
FIG. 5 is a view of an alternate embodiment to that shown in FIG. 2.
Figure 6:
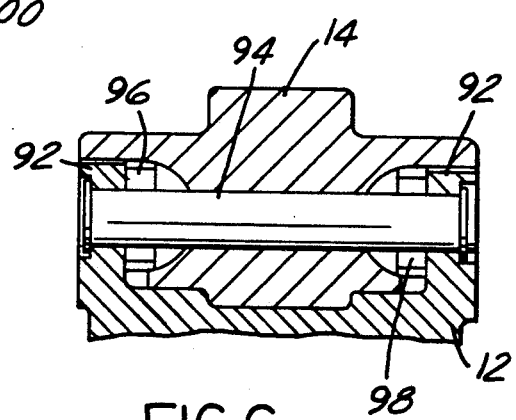
FIG. 6 is a cross-sectional view taken on a plane indicated by and viewed in the direction of the arrows IV—IV of FIG. 5.

FIGS. 5 and 6 show an alternative construction for connecting the hydraulic cylinder pistons/plungers 40, 42 to the crank journal 12. More specifically, a pair of finger-like protrusions 92 project outwardly from opposite sides of the journal 12, and are joined together by a cross pin 94, as seen in FIG. 6. The cross pin carries a pair of rectangular blocks 96, 98 that are engaged and retained in vertical slots in the plungers 40, 42. Part of the force transmitted from the connecting rod to the eccentric 14 is transmitted to the crankshaft through the trapped oil in one of the fluid chambers 60, 62, and further through the plungers to the blocks 96, 98, and therefrom through the cross pin 94 to the protrusions 92. The pin passes through an arch-shaped slot 100, shown in dotted lines, which permits rotation of the eccentric about the point B without interference with the pin 94 when oil flow between chamber 60 and 62 takes place. FIGS. 7a and 7b show the slot and pin more clearly in position.

A further feature of the mechanism is its inherent self-centering, self-correcting property. If, during normal operation of the engine, the eccentric moves out of the prescribed position because of oil leakage from the cylinders, or for some other reason, its rotation relative to the control cam lobe 68 will open one of the check valves 56 or 58. The resulting flow of oil between the chambers 60, 62 will then automatically restore the original position of the eccentric in which both check valves are closed.

While the invention has been described and shown in its preferred embodiments, it will be clear to those skilled in the arts to which it pertains that many changes and modifications may be made thereto without departing from the scope of the invention.

I claim:

1. An automotive type internal combustion engine having a piston reciprocably movable within the engine cylinder in a manner defining a normally fixed clearance volume between the piston and the engine cylinder head and a normally fixed stroke of the piston, an engine crankshaft member, a rod operably connecting the piston to the crankshaft member, and an eccentric member between the rod and crankshaft member to vary the clearance volume and the stroke of the piston, including a pair of closed hydraulic cylinders fixed to one of the members and filled with fluid, a plunger within each of the cylinders operably connected to the other of the members and defining pressure chambers between opposite ends of each plunger and its cylinder, and fluid passage means hydraulically interconnecting the opposite end chambers of each cylinder to each other whereby relative movement between the plunger and chamber effects a transfer of fluid from one end chamber to the opposite end chamber, and vice versa, thereby effecting angular relative movement between the eccentric member and the crankshaft member, the eccentric member being movable in response to the reciprocating motions of the piston and connecting rod imparting torsional forces on the eccentric member and cylinders alternately pressurizing opposite ends of each chamber and moving the eccentric member relative to the crankshaft member upon relative movement between the plungers and the cylinders, and hydraulic control means operable to control the flow of fluid from one cylinder end chamber to its opposite end chamber to permit or prevent said latter relative movement.

2. An automotive type internal combustion engine having a piston reciprocably movable within the engine cylinder in a manner defining a normally fixed clearance volume between the piston and the engine cylinder head and a normally fixed stroke of the piston, an engine crankshaft member, a rod operably connecting the piston through the crank journal to the crankshaft member having a crank journal, and an eccentric member between the rod and crank journal to vary the clearance volume and the stroke of the piston, a closed hydraulic cylinder connected to one of the members and filled with fluid and a plunger receivable therein connected to the other member, with end fluid chambers between the plunger and cylinder, passage means interconnecting the end chambers, and fluid pressure control means operable to control the exchange of fluid between the respective chambers to prevent or effect relative ,movement between the eccentric and crankshaft members via said plunger to maintain or vary, respectively, the clearance volume, the eccentric member being acted upon by and movable in an arcuate direction when permitted to do so in response to torque impulses of the engine applied through the piston and connecting rod to the eccentric member to change the stroke of the piston and the clearance volume, and other means to render the fluid pressure control means operable to prevent or permit the movement of the eccentric member relative to the crankshaft member.

3. An automotive type internal combustion engine having a piston reciprocably movable within the engine cylinder in a manner defining a normally fixed clearance volume between the piston and the engine cylinder head and a normally fixed stroke of the piston, an engine crankshaft member, a rod operably connecting the piston to the crankshaft member, and an eccentric member between the rod and crankshaft member to vary the clearance volume and the stroke of the piston, including a pair of closed hydraulic cylinders fixed to the eccentric member and filled with fluid, each cylinder having a plunger therein operably connected to the crankshaft member for a relative movement between the cylinder and plunger, the opposite ends of each cylinder being fluid interconnected whereby the exchange of fluid from one end to the other end effects a relative movement between the plunger and its cylinder, the connecting rod and eccentric member being subjected to the application of reversing engine torque impulses that generate alternating pressure impulses in the end chambers of the cylinder effecting the exchange of fluid and relative movement between the plunger and cylinder, selectively operable fluid pressure control means operable to control the interflow of fluid between the end chambers to prevent or effect relative movement between the eccentric and crankshaft members to maintain or vary, respectively, the clearance volume, and other means to render the fluid pressure control means operable to prevent or permit the movement of the eccentric member relative to the crankshaft member.

4. An engine as in claim 2, the fluid pressure control means being selectively operable.

5. An engine as in claim 2, wherein the cylinder is fixed within the eccentric for movement therewith, and the plunger is relatively non-movably operably interconnected with the crank journal.

6. An engine as in claim 2, the other means including one-way check valves associated with each chamber for controlling flow of fluid to and from the respective ends of each cylinder, and selectively movable cam means selectively operable to alternately open the check valves to permit the flow of fluid between ends of the chamber.

7. An engine as in claim 3, the other means including one-way check valves associated with each chamber for controlling flow of fluid to and from the respective ends of each cylinder, and cam means selectively operable to alternately open the check valves to permit the flow of fluid between ends of the chamber.

8. An engine as in claim 6, including a shaft having the cam means fixed thereon and operably rotatable to operate the check valves to move the cylinder and thereby change the clearance volume.

9. An engine as in claim 6, the means connecting opposite ends of the chamber comprising fluid passage means containing the one-way check valves, the valves facing one another in fluid flow direction whereby flow in one direction opens one valve and closes the other, and vice-versa, push rod means engageable with each of the check valves and selectively movable to open the valve associated therewith, the cam means being selectively operable and engageable with the push rods for alternate actuation thereof.

10. An engine as in claim 7, the means connecting opposite ends of the chamber comprising fluid passage means containing the one-way check valves, the valves facing one another in fluid flow direction whereby flow in one direction opens one valve and closes the other, and vice-versa, push rod means engageable with each of the check valves and selectively movable to open the valve associated therewith, the cam means being selectively operable and engageable with the push rods for alternate actuation thereof.

11. An engine as in claim 8, wherein the other means are contained within the eccentric member.

12. An engine as in claim 8, wherein the plunger is operably spline connected to the crank journal.

13. An engine as in claim 8, wherein the plunger is provided with a recess for receiving a finger-like projection from the crank journal for operably locking the two together while accommodating a limited angular movement relative thereto during angular movement of the eccentric relative to the crank journal.

14. An engine as in claim 7, wherein the cylinders are symmetrically arranged on opposite sides of the eccentric.

15. An engine as in claim 8, wherein the shaft is spring biased to a first position moving the shaft and cam means to block the flow of fluid between the end chambers to effect rotation of the eccentric and crank journal as a unit, and movable by fluid under pressure to alternate positions variably rotating the cam means to variably position the eccentric relative to the crank journal.

16. An engine as in claim 15, wherein the shaft and cam means are helically interconnected, the cam means comprising a sleeve receiving the shaft within it.

17. An engine as in claim 2, wherein the said eccentric member is mounted on the crank journal such that a line connecting the center of the said crank journal with the center of the eccentric member forms an acute angle with an upward extension of the line connecting the crankshaft main centerline with the center of the crank journal, said acute angle being to one side or the other of the said upward extension line as a function of the direction of rotation of the crankshaft member to equalize the counterclockwise and clockwise torques acting on the eccentric member.

* * * * *